US007929947B2

(12) United States Patent
Shimura et al.

(10) Patent No.: US 7,929,947 B2
(45) Date of Patent: Apr. 19, 2011

(54) COMMUNICATION APPARATUS AND METHOD FOR SETTING COMMUNICATION PARAMETERS

(75) Inventors: Hajime Shimura, Koshigaya (JP); Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 928 days.

(21) Appl. No.: 11/777,619

(22) Filed: Jul. 13, 2007

(65) Prior Publication Data

US 2008/0026764 A1 Jan. 31, 2008

(30) Foreign Application Priority Data

Jul. 31, 2006 (JP) ................................ 2006-208934

(51) Int. Cl.
*H04M 1/66* (2006.01)
*H04M 3/00* (2006.01)
*H04M 1/00* (2006.01)

(52) U.S. Cl. ..... 455/411; 455/410; 455/418; 455/550.1; 455/556.2; 455/561

(58) Field of Classification Search .............. 455/41.2, 455/62, 124, 410–411, 418–420, 432.2–432.3, 455/434, 435.1–435.3, 446–451, 524–525, 455/550.1, 551, 552.1, 553.1, 556.2, 557–558, 455/561, 514, 517–519; 370/310, 338, 349–350, 370/252, 328–329, 341, 395.3, 395.5, 395.52; 709/FOR. 131, 221–222, 227–229; 726/2–3, 726/6, 14; 713/166, 168–169, 171; 380/44–45, 380/247, 270, 272, 277–278, 281, 283

See application file for complete search history.

(56) References Cited

U.S. PATENT DOCUMENTS

| 7,043,244 | B1 * | 5/2006 | Fauconnier | 455/442 |
| 7,356,011 | B1 * | 4/2008 | Waters et al. | 370/338 |
| 7,583,645 | B2 * | 9/2009 | Qi et al. | 370/338 |
| 7,720,477 | B2 * | 5/2010 | Moritomo et al. | 455/435.1 |
| 2004/0076300 | A1 | 4/2004 | Ishidoshiro | |
| 2005/0060364 | A1 * | 3/2005 | Kushwaha et al. | 709/200 |
| 2005/0201557 | A1 | 9/2005 | Ishidoshiro | |
| 2005/0238172 | A1 | 10/2005 | Tamura | |
| 2006/0268743 | A1 * | 11/2006 | Yoshida | 370/254 |
| 2007/0190973 | A1 * | 8/2007 | Goto et al. | 455/410 |
| 2007/0258415 | A1 * | 11/2007 | Lu et al. | 370/338 |

FOREIGN PATENT DOCUMENTS

| CN | 1481651 A | 3/2004 |
| JP | 2004-215232 | 7/2004 |
| JP | 2005-311653 | 11/2005 |
| WO | 01/39538 A | 5/2001 |

OTHER PUBLICATIONS

The above references were cited in a Apr. 13, 2010 Chinese Office Action, which is enclosed with English Translation, that issued in Chinese Patent Application No. 200710143434.7.

* cited by examiner

*Primary Examiner* — Meless N Zewdu
(74) *Attorney, Agent, or Firm* — Cowan, Liebowitz & Latman, P.C.

(57) ABSTRACT

Disclosed is a communication apparatus that supports a plurality of setting schemes for setting communication parameters. If, after communication parameters have been set by a first setting scheme, a change is made to set communication parameters by a second setting scheme, the apparatus selects communication parameters capable of being set in common by another apparatus connected to the communication apparatus by the first setting scheme and another apparatus connected to the communication apparatus by the second setting scheme.

12 Claims, 12 Drawing Sheets

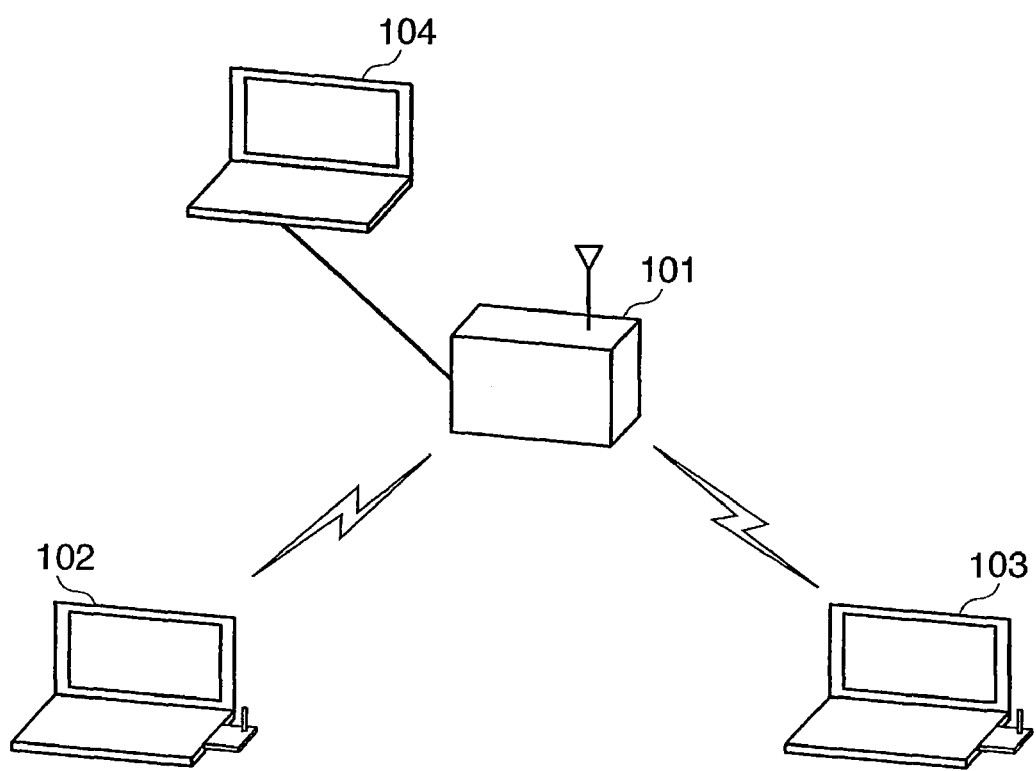
F I G. 1

FIG. 6A

| Name | Authentication Type | Encryption Type | |
|---|---|---|---|
| Type-1 | WPA, WPAPSK shared, OPEN | AES, TKIP WEP(128/64) | ~601 |
| Type-2 | — | — | ~602 |
| Current AP | WPA | AES | ~603 |

FIG. 6B

| Name | Authentication Type | Encryption Type |
|---|---|---|
| Type-1 | WPA, WPAPSK shared, OPEN | AES, TKIP WEP(128/64) |
| Type-2 | — | — |
| Current AP | WPA (Locked) | AES (Locked) |

604　605

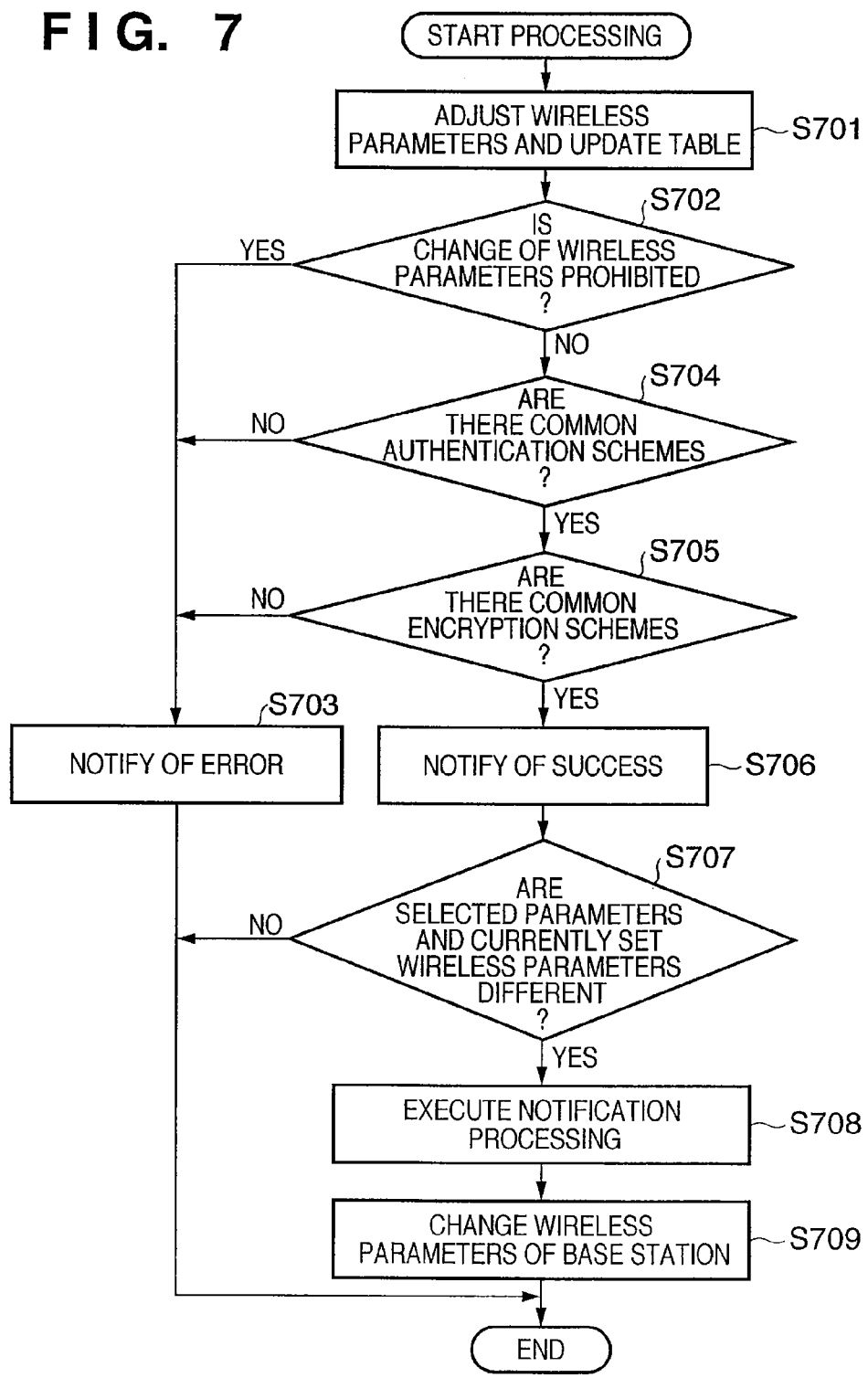

FIG. 8A

| Name | Authentication Type | Encryption Type | |
|---|---|---|---|
| Type-1 | WPA, WPAPSK shared, OPEN | AES, TKIP WEP(128/64) | ~801 |
| Type-2 | WPAPSK shared, OPEN | TKIP WEP(128/64) | ~802 |
| Current AP | WPA | AES | ~803 |

FIG. 8B

| Name | Authentication Type | Encryption Type | |
|---|---|---|---|
| Type-1 | WPA, WPAPSK shared, OPEN | AES, TKIP WEP(128/64) | |
| Type-2 | WPAPSK shared, OPEN | TKIP WEP(128/64) | |
| Current AP | WPAPSK | TKIP | ~804 |

FIG. 10A

| Config Type | Authentication Type | Encryption Type | |
|---|---|---|---|
| Type-1 | WPA, WPAPSK shared, OPEN | AES, TKIP WEP(128/64) | |
| Type-2 | – | – | ~1001 |
| Current AP | WPAPSK | TKIP | ~1002 |

FIG. 10B

| Name | Authentication Type | Encryption Type | |
|---|---|---|---|
| Type-1 | WPA, WPAPSK shared, OPEN | AES, TKIP WEP(128/64) | |
| Type-2 | – | – | |
| Current AP | WPA | AES | ~1003 |

COMMUNICATION APPARATUS AND METHOD FOR SETTING COMMUNICATION PARAMETERS

BACKGROUND OF THE INVENTION

1. Field of the Invention

The present invention relates to a communication apparatus that supports a plurality of setting schemes for setting communication parameters and to a method of setting these communication parameters.

2. Description of the Related Art

The spread of wireless LANs compliant with the IEEE 802.11 standard has been accompanied by increasing demand for techniques that make it possible to set, in simple fashion, wireless parameters necessary for wireless LAN communication, such as a network identifier (SSID), encryption scheme, encryption key, authentication scheme and authentication key, which are troublesome for a user to set.

Conventionally, wireless LAN devices are equipped with techniques for setting wireless parameters developed independently by various companies. These techniques simplify the setting of the wireless parameters.

A technique for setting wireless parameters is for the purpose of communicating parameters, which are necessary for wireless LAN communication, between a terminal and a base station [e.g., see the specification of Patent Document 1: Japanese Patent Application Laid-Open No. 2004-215232 (U.S. Patent Application Publication Nos. 2004-076300, 2005-201557)].

Further, there is a method of changing the wireless parameters of a base station in dependence upon an increase or decrease in number of terminals that participate in a network [e.g., see the specification of Patent Document 2: Japanese Patent Application Laid-Open No. 2005-311653 (U.S. Patent Application Publication No. 2005-238172)].

Furthermore, standards for setting wireless parameters between devices in a simple manner are currently being planned.

It is predicted, therefore, that future wireless LAN devices will come equipped with both a setting scheme developed independently by the company (referred to as an "independent scheme" below) and a standard setting scheme (referred to as a "standard scheme" below)

Each of the above-mentioned setting schemes sets the wireless parameters of a wireless device connected to a base station based upon a respective setting algorithm. Assume that there is a base station that supports both the standard scheme and the independent scheme. If the wireless parameters set by a first setting scheme are changed to the wireless parameters of a second setting scheme in such case, there will be instances where the wireless device that was connected first becomes incapable of communicating.

Further, if the wireless parameters set by the first setting scheme are changed to the wireless parameters of the second setting scheme, then the set state of the wireless parameters at a base station managed by the first setting scheme will differ from the current set state. As a result, if a setting is made by the first setting scheme after the wireless parameters are changed, wireless parameters that differ from those of the current settings of the base station are set in the wireless device and the wireless device may become incapable of communicating.

Thus, a problem which arises is that in a case where a plurality of different wireless parameter setting schemes operate, a setting of optimum communication parameters cannot be made owing to independent operation of each setting scheme.

SUMMARY OF THE INVENTION

The present invention realizes to link the setting of communication parameters by each of a plurality of communication-parameter setting schemes in a case where a plurality of such schemes is supported.

According to one aspect of the present invention, there is provided a communication apparatus comprising: a first setting unit adapted to execute communication-parameter setting processing by a first setting scheme; a second setting unit adapted to execute communication-parameter setting processing by a second setting scheme that is different from the first setting scheme; and a selecting unit adapted to, in a case where communication parameters are changed by the second setting scheme after the communication parameters have been set by the first setting scheme, select communication parameters capable of being set in common by another apparatus connected to the communication apparatus by the first setting scheme and another apparatus connected to the communication apparatus by the second setting scheme.

According to another aspect of the present invention, there is provided a method of setting communication parameters of a communication apparatus that is capable of executing communication-parameter setting processing by a first setting scheme and communication-parameter setting processing by a second setting scheme that is different from the first setting scheme, the method comprising a selecting step of, in a case where the communication parameters are changed by the second setting scheme after the communication parameters have been set by the first setting scheme, selecting communication parameters capable of being set in common by another apparatus connected to the communication apparatus by the first setting scheme and another apparatus connected to the communication apparatus by the second setting scheme.

Further features of the present invention will become apparent from the following description of exemplary embodiments (with reference to the attached drawings).

BRIEF DESCRIPTION OF THE DRAWINGS

FIG. 1 is a diagram illustrating an example of the configuration of a wireless LAN system according to a first embodiment of the present invention;

FIGS. 6A and 6B are diagrams illustrating examples of the content of a wireless parameter adjustment table stored in a RAM of the wireless base station apparatus;

FIG. 7 is a flowchart illustrating adjustment processing and notification processing by the wireless base station apparatus according to the first embodiment;

FIGS. 8A and 8B are diagrams illustrating wireless parameter adjustment tables updated by adjustment processing according to the first embodiment;

FIGS. 10A and 10B are diagrams illustrating wireless parameter adjustment tables updated by adjustment processing according to the second embodiment;

DESCRIPTION OF THE EMBODIMENTS

Preferred embodiments of the present invention will now be described in detail with reference to the drawings.

First Embodiment

FIG. 1 is a diagram illustrating an example of the configuration of a wireless LAN system according to a first embodiment of the present invention. The wireless LAN system illustrated in FIG. 1 comprises a base station 101, a wireless apparatus 102, a wireless apparatus 103 and a management apparatus 104. The base station 101, wireless apparatus 102 and wireless apparatus 103 each have a wireless LAN communication function compliant with the IEEE 802.11 standard and perform wireless communication over a network in the infrastructure mode. When wireless communication is performed in the infrastructure mode, the base station 101 operates as an access point and each wireless apparatus 102, 103 operates as a station. Further, the management apparatus 104 is connected to the base station 101 by a wired LAN.

In the first embodiment, two methods of setting wireless parameters exist. The first is a setting scheme in which a wireless apparatus is set to wireless parameters received from the management apparatus 104 using the base station 101 as a relay. The second is a setting scheme in which a wireless apparatus is set to wireless parameters received from the base station 101.

Here it is assumed that the wireless apparatus 102 supports the first setting scheme, that the wireless apparatus 103 supports the second setting scheme and that the base station 101 supports both the first and second setting schemes. Further, the management apparatus 104 stores and manages wireless parameters that have been set in the base station 101 and, in accordance with a request from a wireless apparatus that supports the first setting scheme, provides the wireless apparatus with wireless parameters.

Next, examples of the structures of the base station 101, wireless apparatus 102, wireless apparatus 103 and management apparatus 104 that construct the wireless LAN system illustrated in FIG. 1 will be described with reference to FIGS. 2 to 5.

Figure 2:
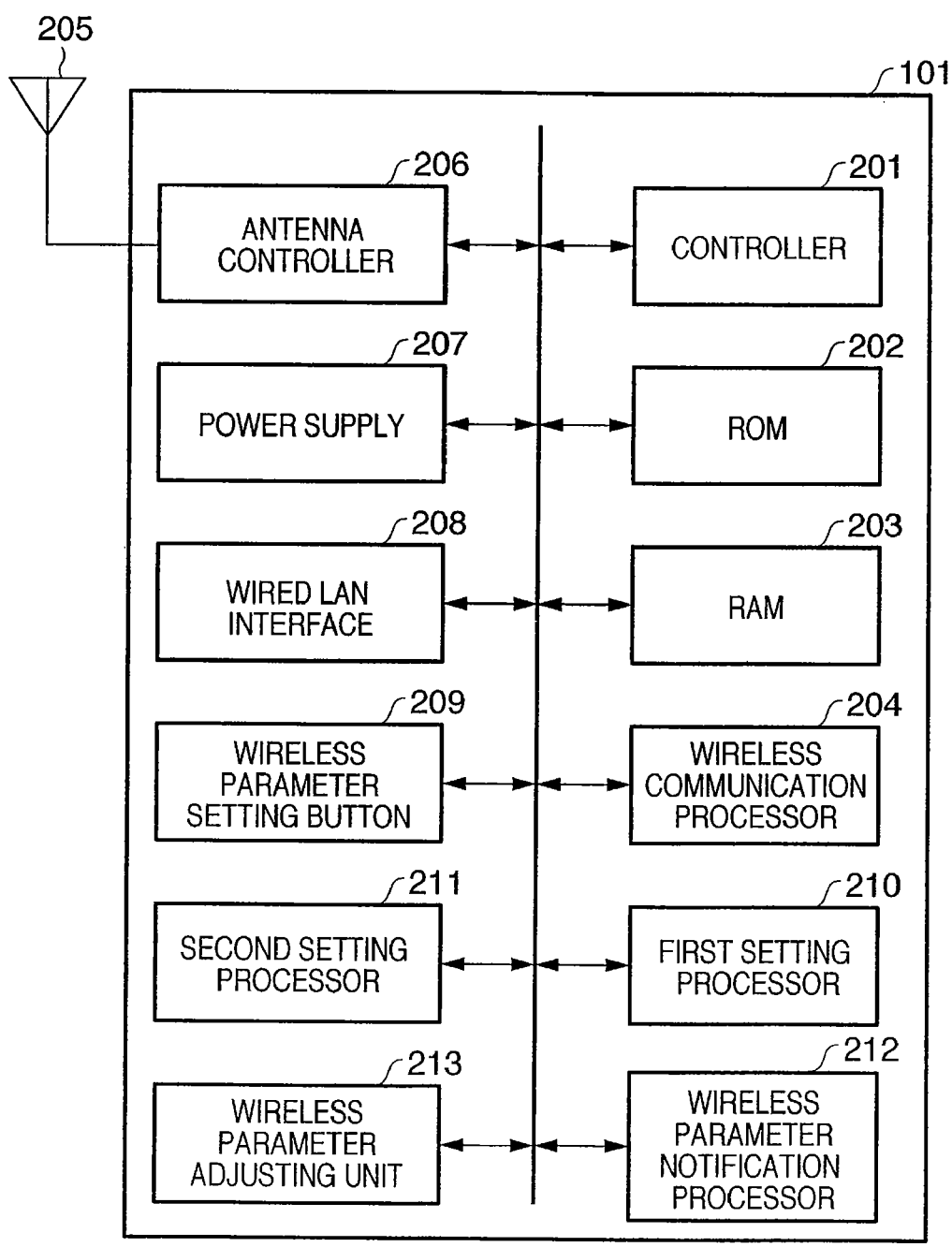
FIG. 2 is a block diagram illustrating an example of the structure of a wireless base station apparatus according to the first embodiment.

FIG. 2 is a block diagram illustrating an example of the structure of the base station 101 according to the first embodiment. As illustrated in FIG. 2, the base station 101 includes a controller 201 for controlling the overall base station 101. The controller 201 exercises various types of control, described below, by executing control instructions, namely programs, that have been stored in a ROM 202. Programs stored in the ROM 202 cause the controller 201 to execute various types of control, described later. A wireless parameter adjustment table, described later in detail, is stored in a RAM 203. A wireless communication processor 204 controls communication of a wireless LAN. The base station 101 has an antenna 205 and an antenna controller 206.

The base station 101 further includes a power supply 207 and a wired LAN interface 208 such as a USB or IEEE 1394. A wireless parameter setting button 209 is for starting up processing to set wireless parameters. A first setting processor 210 controls processing for setting wireless parameters by the first setting scheme, and a second setting processor 211 controls processing for setting wireless parameters by the second setting scheme. When processing for setting wireless parameters is executed, the first setting processor 210 and second setting processor 211 receive wireless parameters, which are supported by the wireless apparatus of the setting party, from this wireless apparatus and report the received wireless parameters to a wireless parameter adjusting unit 213. A wireless parameter notification processor 212 notifies the management apparatus 104 of the wireless parameters. The wireless parameter adjusting unit 213 executes processing for adjusting wireless parameters based upon the wireless parameter adjustment table, the details of which are described later.

Figure 3:
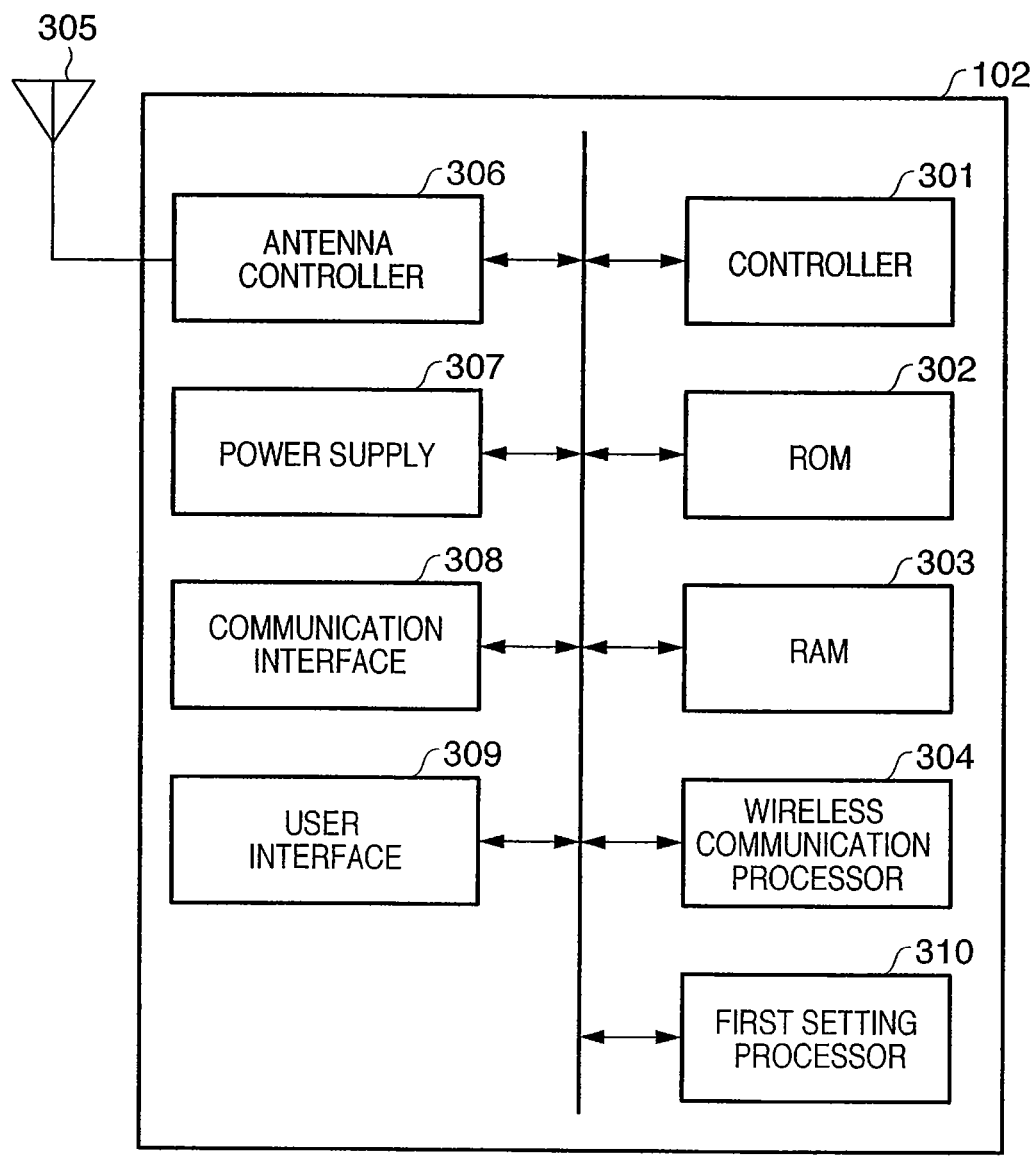
FIG. 3 is a block diagram illustrating an example of the structure of a wireless terminal according to the first embodiment.

FIG. 3 is a block diagram illustrating an example of the structure of the wireless apparatus 102 according to the first embodiment. As illustrated in FIG. 3, the wireless apparatus 102 includes a controller 301 for controlling the overall wireless apparatus 102. The controller 301 exercises various types of control, described below, by executing control instructions, namely programs, that have been stored in a ROM 302. Programs stored in the ROM 302 cause the controller 301 to execute various types of control, described later. The apparatus further includes a RAM 303, a wireless communication processor 304 for controlling communication of the wireless LAN, an antenna 305 and an antenna controller 306.

The wireless apparatus 102 further includes a power supply 307, a communication interface 308 such as a USB or IEEE 1394, a user interface 309 and a first setting processor 310 for controlling processing for setting wireless parameters by the first setting scheme.

Figure 4:
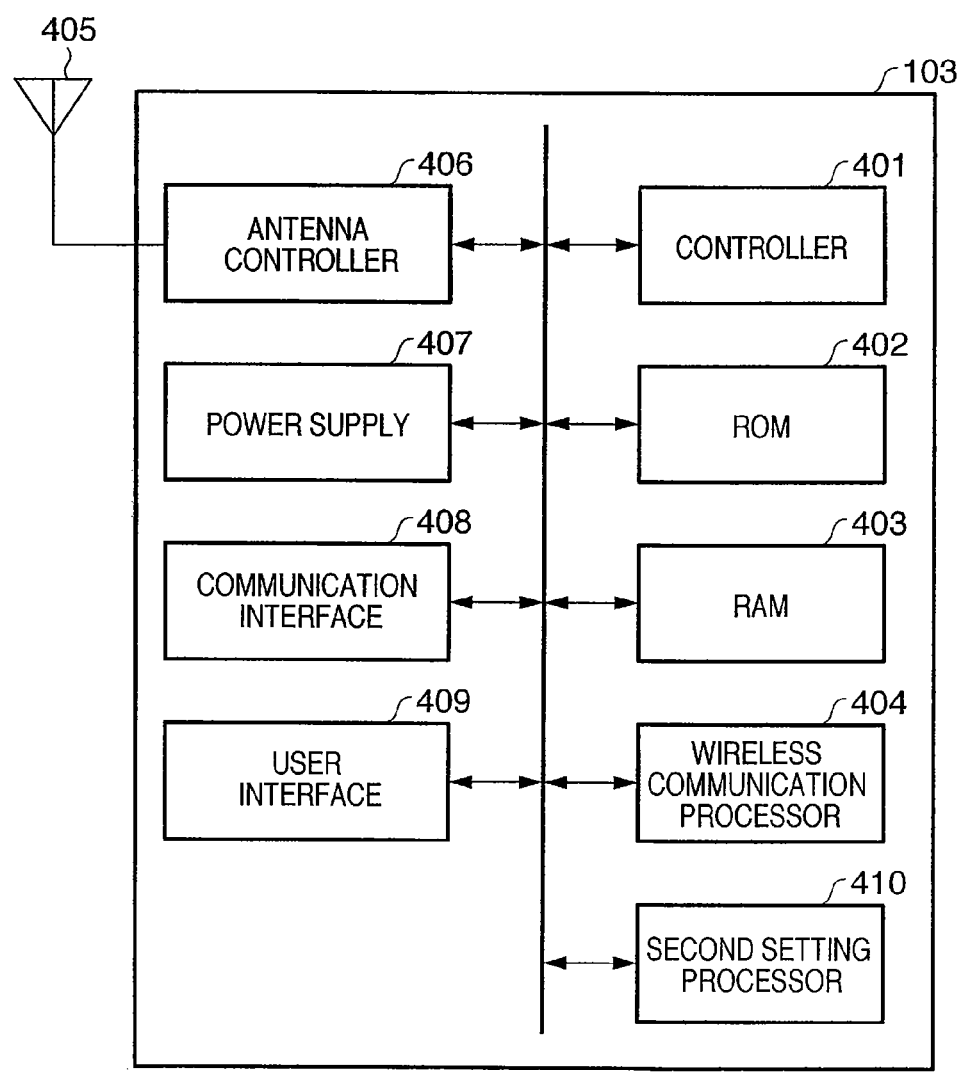
FIG. 4 is a block diagram illustrating an example of the structure of a wireless terminal according to the first embodiment.

FIG. 4 is a block diagram illustrating an example of the structure of the wireless apparatus 103 according to the first embodiment. As illustrated in FIG. 4, the wireless apparatus 103 includes a controller 401 for controlling the overall wireless apparatus 103. The controller 401 exercises various types of control, described below, by executing control instructions, namely programs, that have been stored in a ROM 402. Programs stored in the ROM 402 cause the controller 401 to execute various types of control, described later. The apparatus further includes a RAM 403, a wireless communication processor 404 for controlling communication of the wireless LAN, an antenna 405 and an antenna controller 406.

The wireless apparatus 103 further includes a power supply 407, a communication interface 408 such as a USB or IEEE 1394, a user interface 409 and a second setting processor 410 for controlling processing for setting wireless parameters by the second setting scheme.

Figure 5:
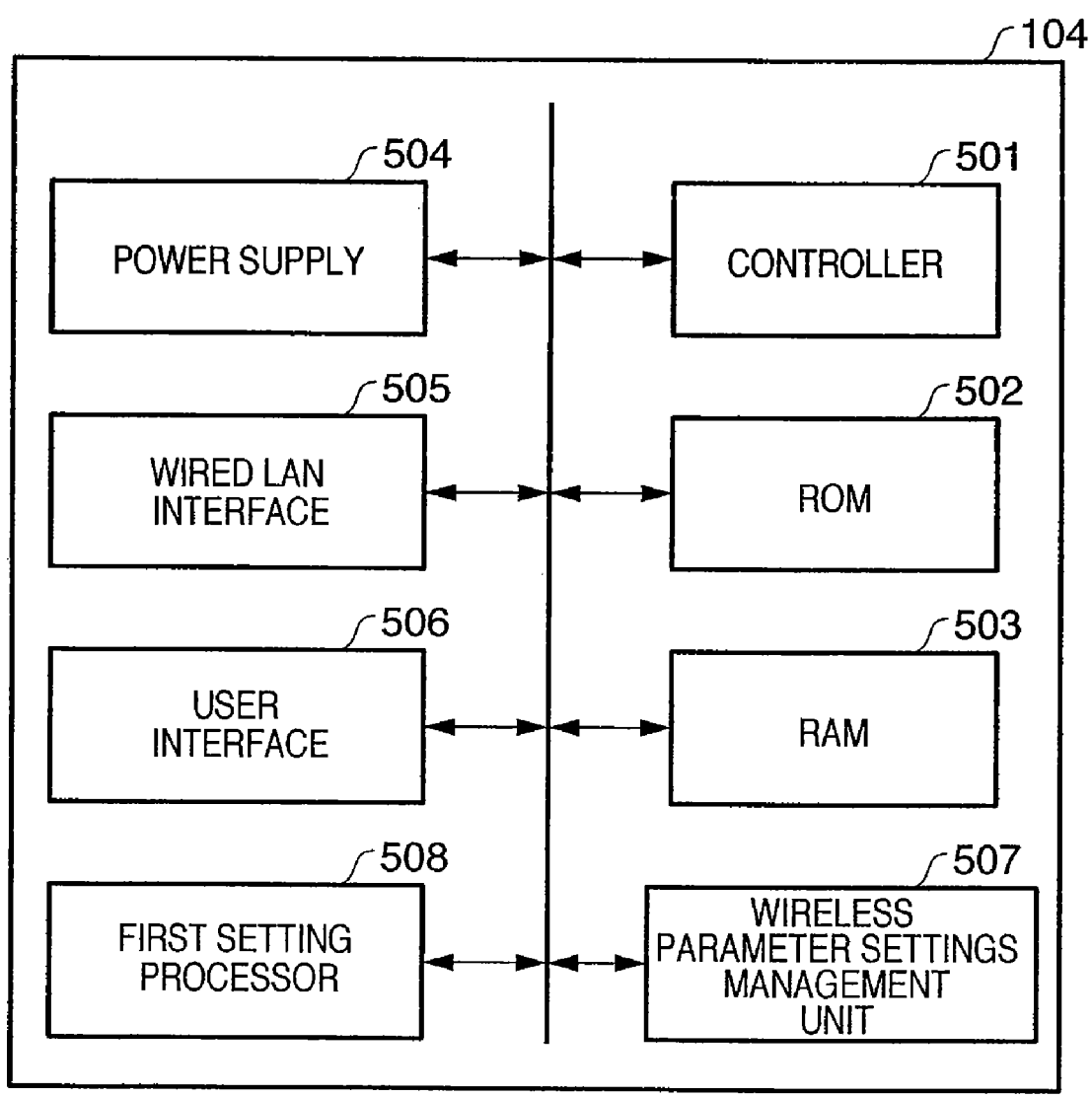
FIG. 5 is a block diagram illustrating an example of the structure of a wireless settings management apparatus according to the first embodiment.

FIG. 5 is a block diagram illustrating an example of the structure of the management apparatus 104 according to the first embodiment. As shown in FIG. 5, the management apparatus 104 includes a controller 501 for controlling the overall management apparatus 104. The controller 501 exercises various types of control, described below, by executing control instructions, namely programs, that have been stored in a ROM 502. Programs stored in the ROM 502 cause the controller 501 to execute various types of control, described later. The apparatus further includes a RAM 503.

The management apparatus 104 further includes a power supply 504, a wired LAN interface 505 such as a USB or IEEE 1394, a user interface 506, a wireless parameter settings management unit 507 for storing and managing wireless parameters by the first setting scheme, and a first setting processor 508 for controlling processing for setting wireless parameters by the first setting scheme.

FIGS. 6A and 6B are diagrams illustrating examples of the content of the wireless parameter adjustment table stored in the RAM 203 of the base station 101. As illustrated in FIG. 6A, wireless parameters are registered in the wireless parameter adjustment table, these parameters being wireless parameters 601 that correspond to the first setting scheme, wireless parameters 602 that correspond to the second setting scheme, and wireless parameters 603 that have been set in the base station 101. Information indicative of wireless parameters (authentication scheme and encryption scheme) supported in common by all wireless apparatuses that are connected to the base station 101 and that support the first setting scheme is registered in the wireless parameters 601. Further, information indicative of an authentication scheme and an encryption scheme supported in common by all wireless apparatuses that are connected to the base station 101 and that support the second setting scheme is registered in the wireless parameters 602. When the first setting processor 210 executes processing for setting wireless parameters in a wireless apparatus, the wireless parameter adjusting unit 213 receives wireless parameters, which are supported by the wireless apparatus that sets the wireless parameters, from the first setting processor 210. Upon receiving the wireless parameters, the wireless parameter adjusting unit 213 compares the wireless parameters that have already been registered as the wireless parameters 601 with the received wireless parameters, updates parameters that are supported in common and registers these parameters as the wireless parameters 601. Similarly, when the second setting processor 211 executes processing for setting wireless parameters in a wireless apparatus, the wireless parameter adjusting unit 213 receives wireless parameters, which are supported by the wireless apparatus that sets the wireless parameters, from the second setting processor 211. Upon receiving the wireless parameters, the wireless parameter adjusting unit 213 compares the wireless parameters that have already been registered as the wireless parameters 602 with the received wireless parameters, updates parameters that are supported in common and registers these parameters as the wireless parameters 602.

In this example, wireless parameters usable by the wireless apparatus 102 that supports the first setting scheme are registered as the wireless parameters 601. Further, the schemes to which the base station 101 is currently set are an authentication scheme (WPA) and an encryption scheme (AES). Accordingly, the wireless apparatus 102 is connected to the base station 101 using the authentication scheme (WPA) and encryption scheme (AES).

If the base station 101 has been set to prohibit a change in the current wireless parameters, then information indicating that a change is prohibited is appended to the current wireless parameters 602 in the wireless parameter adjustment table (see 604 and 605 in FIG. 6B).

It should be noted that the wireless parameter adjustment table is referred to in processing for adjusting wireless parameters, described later in detail. Further, although authentication and encryption schemes are mentioned as examples of wireless parameters, the present invention is not limited thereto. For instance, other information that requires setting at the time of wireless communication, such as network identification information, may be added on as well.

Next, reference will be had to FIG. 7 and to FIGS. 8A, 8B to describe processing executed when the wireless apparatus 103 participates in an infrastructure-mode network after the base station 101 has formed the network with the wireless apparatus 102.

Adjustment processing by the wireless parameter adjusting unit 213 is started up by the second setting processor 211 when the wireless apparatus 103 participates in the network of the base station 101 using the second setting scheme.

FIG. 7 is a flowchart illustrating adjustment processing and notification processing by the base station 101 according to the first embodiment.

In order for the wireless apparatus 103 to participate in the network of the base station 101, the wireless apparatus 103 requests the base station 101 for wireless parameters by the second setting scheme. When the request is made, the wireless apparatus 103 notifies the base station 101 of the wireless parameters (authentication scheme and encryption scheme) usable by the wireless apparatus 103.

At step S701, the second setting processor 211 receives the wireless parameters from the wireless apparatus 103, whereupon the second setting processor 211 notifies the wireless parameter adjusting unit 213 of the parameters received. The wireless parameter adjusting unit 213 acquires the wireless parameters from the second setting processor 211 and adds these to the wireless parameter adjustment table.

FIGS. 8A and 8B are diagrams illustrating the wireless parameter adjustment table updated by the adjustment processing according to the first embodiment. FIG. 8A illustrates a state in which wireless parameters 802 corresponding to the second setting scheme have been added to the table, which already contains wireless parameters 801 corresponding to the first setting scheme. Further, since current wireless parameters 803 have not been changed in this state, WPA and AES have been registered here in a manner similar to that of FIG. 6A. It should be noted that in a case where the wireless parameters have already been registered as the wireless parameters 802 corresponding to the second setting scheme, the wireless parameter adjusting unit 213 compares the wireless parameter acquired from the wireless apparatus 103 with the already registered wireless parameters. The wireless parameter adjusting unit 213 then updates the wireless parameters to the wireless parameters in common by both. As a result, information indicating the authentication scheme and encryption scheme supported in common by all wireless apparatuses that are connected to the base station 101 and that support the second setting scheme is registered as the wireless parameters 802.

With reference again to FIG. 7, after the wireless parameter adjustment table is updated as described above, the wireless parameter adjusting unit 213 refers to the table and determines at step S702 whether the wireless parameters in the base station 101 are prohibited from being changed. If a change is prohibited, then control proceeds to step S703; otherwise, control proceeds to step S704.

The wireless parameter adjusting unit 213 notifies the second setting processor 211 of adjustment failure and terminates this adjustment processing at step S703. Upon being notified of adjustment failure, the second setting processor 211 terminates in error the setting processing based upon the second setting scheme and which being carried out in conjunction with the wireless apparatus 103.

At step S704, the wireless parameter adjusting unit 213 refers to the wireless parameter adjustment table and determines whether there are authentication schemes capable of supporting in common by the first and second setting schemes. If the result is that there is no the common authentication scheme, then control proceeds to step S703. Here adjustment failure is reported and processing ends in error in the manner described above. If the common authentication schemes exist, however, then the wireless parameter adjusting unit 213 selects the authentication scheme having the highest degree of security from among these common authentication schemes. In the example of FIG. 8A, WPAPSK, which has the highest degree of security among the common authentication schemes, is selected.

Next, at step S705, the wireless parameter adjusting unit 213 refers to the wireless parameter adjustment table and determines whether there are encryption schemes capable of supporting in common by the first and second setting schemes. If the result is that there is no the common encryption scheme, then control proceeds to step S703. Here adjustment failure is reported and processing ends in error in the manner described above. If the common encryption schemes exist, however, then the wireless parameter adjusting unit 213 selects the encryption scheme having the highest degree of security from among these common encryption schemes. In the example of FIG. 8A, TKIP, which has the highest degree of security among the common encryption schemes, is selected.

At step S706, the wireless parameter adjusting unit 213 notifies the second setting processor 211 of success of wireless parameter adjustment and notifies the second setting processor 211 of the wireless parameters selected at steps S704 and S705. Upon receiving this notification, the second setting processor 211 transmits the reported wireless parameters to the wireless apparatus 103.

Next, at step S707, the wireless parameter adjusting unit 213 determines whether the wireless parameters selected at steps S704 and S705 are different from the current wireless parameters 803 that have been set in the base station 101. Control proceeds to step S708 if they are different. If they are not different, then this adjustment processing is exited.

The wireless parameter adjusting unit 213 starts up the wireless parameter notification processor 212 at step S708. By relying upon wired-LAN communication, the wireless parameter notification processor 212 notifies the management apparatus 104 of the wireless parameters selected at steps S704 and 705. The wireless parameters of which notification has been given by the base station are managed by the management apparatus 104 as the current settings of the base station.

Next, at step S709, the wireless parameter adjusting unit 213 updates the current wireless parameters 803 of the network to the wireless parameters 804 selected at steps S704 and S705. This processing is then exited.

In this example, the current wireless parameters 803 in FIG. 8A are updated as indicated at 804 in FIG. 8B. That is, attendant upon participation of the wireless apparatus 103 in the network, the base station 101 updates the authentication scheme to WPAPSK and updates the encryption scheme to TKIP.

The wireless apparatus 103 sets the wireless parameters of which it has been notified at step S706 and participates in the network of the base station 101.

As a result of the processing described above, the wireless apparatus 102 is cut off from the network of the base station 101 if the wireless parameters of this network are changed. Accordingly, in order for the wireless apparatus 102 to obtain wireless parameters that make connection possible, the wireless apparatus 102 communicates with the management apparatus 104 and acquires the current wireless parameters 804 of the base station 101. The wireless apparatus 102 makes the connection to the base station 101 again using the wireless parameters 804 acquired from the management apparatus 104. At this time the wireless apparatus 102 communicates with the management apparatus 104 and acquires the wireless parameters 804 owing to control by the first setting processor 210 of base station 101 using a packet capable of being communicated with the base station 101 irrespective of the settings of the base station 101.

In accordance with the first embodiment described above, when a wireless apparatus having a different wireless parameter setting scheme participates in a network, the base station is capable of setting wireless parameters, which are in common by wireless apparatuses that support each of the setting schemes, in the base station and wireless apparatus. As a result, it is possible to prevent a wireless apparatus that has already been connected to a base station from being disconnected from the base station even if wireless parameters are changed. In addition, it is possible for a wireless apparatus to participate in the network without requiring that the user perform a troublesome operation for setting the wireless apparatus.

Further, a base station having a plurality of wireless parameter setting schemes adjusts wireless parameter settings and notifies a management apparatus of the result of adjustment, whereby wireless parameters changed by a different setting scheme can be reflected in the parameter settings.

It should be noted that the foregoing description relates to a case where communication parameters capable of being set in common by both the first and second setting schemes are set in a case where the wireless apparatus 103 is connected to the base station 101 upon setting of the communication parameters by the second setting scheme after the wireless apparatus 102 has been connected to the base station 101 upon setting of the communication parameters by the first setting scheme. However, it goes without saying that it may be so arranged that communication parameters capable of being set in common by both the first and second setting schemes are set in a case where the wireless apparatus 102 is connected to the base station 101 upon setting of the communication parameters by the first setting scheme after the wireless apparatus 103 has been connected to the base station 101 upon setting of the communication parameters by the second setting scheme.

Second Embodiment

A second embodiment according to the present invention will now be described in detail with reference to the drawings. In the first embodiment, adjustment processing and notification processing in a case where the wireless apparatus 103 that supports the second setting scheme is connected to the base station 101 has been described. In the second embodiment, processing by the base station 101 when the wireless apparatus 103 is disassociated from the network of the base station 101 will be described.

The configuration of the wireless LAN system in the second embodiment is similar to that of the first embodiment described above with reference to FIGS. 1 to 6B.

Figure 9:
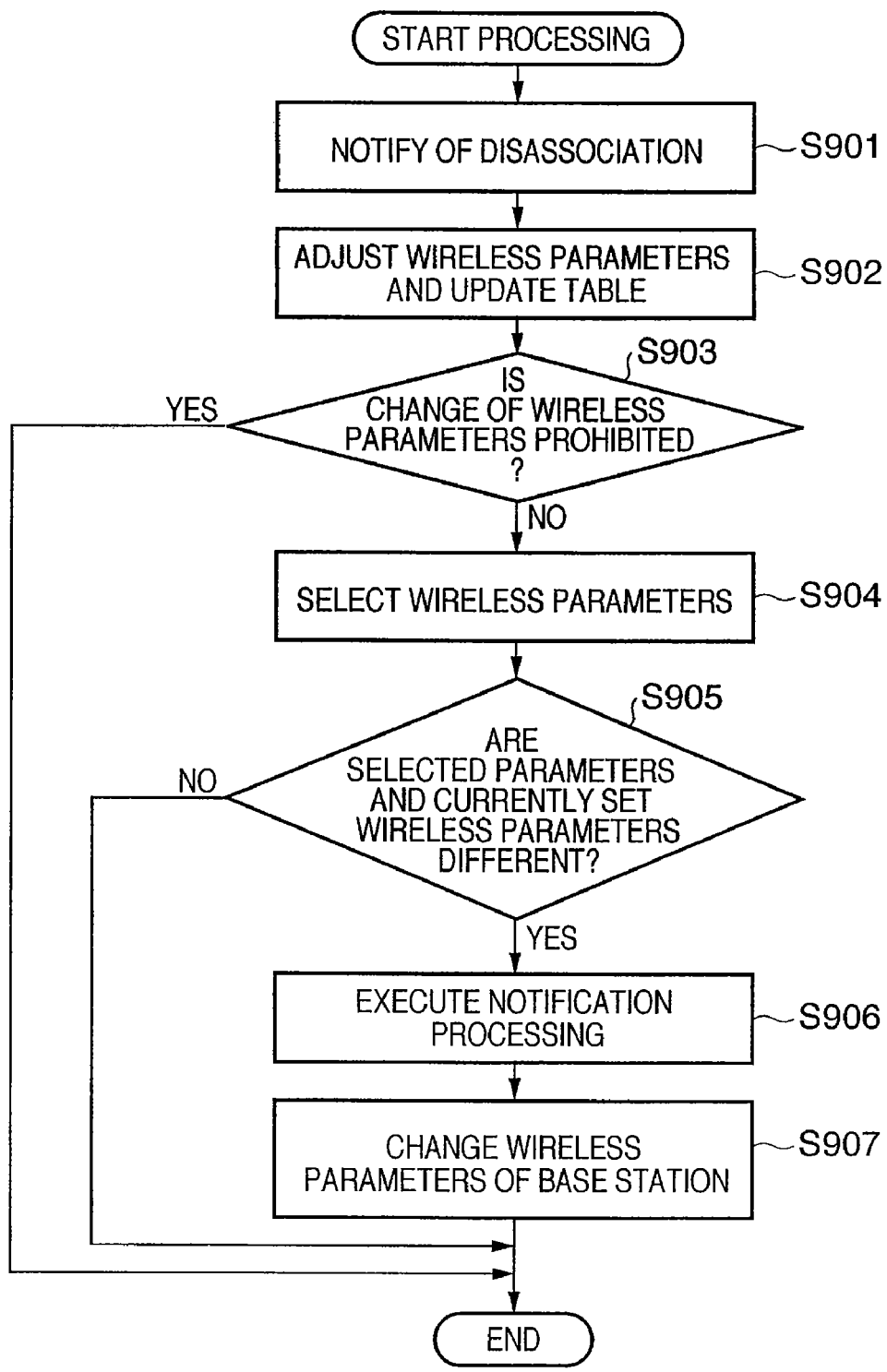
FIG. 9 is a flowchart illustrating adjustment processing and notification processing by the wireless base station apparatus according to a second embodiment of the present invention.

Reference will be had to FIG. 9 and FIGS. 10A, 10B to describe processing executed by the wireless parameter notification processor 212 and wireless parameter adjusting unit 213 when the base station 101 has sensed disassociation of the wireless apparatus 103.

Adjustment processing by the wireless parameter adjusting unit 213 is started up by the wireless communication processor 204 when the wireless apparatus 103 has been disassociated from the network and the wireless communication processor 204 has sensed disassociation of the wireless apparatus 103.

FIG. 9 is a flowchart illustrating adjustment processing and notification processing by the base station 101 according to the second embodiment.

When the wireless apparatus 103 is disassociated from the network formed by the base station 101, the base station 101 is notified of disassociation. At step 901, the wireless communication processor 204 notifies the wireless parameter adjusting unit 213 of disassociation of the wireless apparatus 103, and the wireless parameter adjusting unit 213 detects notification of disassociation of the wireless apparatus 103. Next, at step S902, the wireless parameter adjusting unit 213 updates the wireless parameter adjustment table based upon disassociation of the wireless apparatus 103.

FIGS. 10A and 10B are diagrams illustrating the wireless parameter adjustment table updated by the adjustment processing according to the second embodiment. FIG. 10A illustrates a state in which wireless parameters 1001 supported in common by a wireless apparatus that supports the second setting scheme have been updated attendant upon disassociation of the wireless apparatus 103. In the example shown in FIG. 1, only the wireless apparatus 103 supports the second setting scheme. In FIG. 10A, therefore, the wireless parameters 1001 supported in common by the wireless apparatus that supports the second setting scheme are blank fields. However, if another wireless apparatus that supports the second setting scheme has been connected to the base station, then information indicating the authentication scheme and encryption scheme supported in common by these wireless apparatuses is updated. In the state illustrated, WPAPSK and TKIP have been registered as the current wireless parameters 1002.

With reference again to FIG. 9, after the wireless parameter adjustment table is updated as described above, the wireless parameter adjusting unit 213 refers to the table and determines at step S903 whether the wireless parameters in the base station 101 are prohibited from being changed. If a change is prohibited, then this processing is exited; otherwise, control proceeds to step S904.

At step S904, the wireless parameter adjusting unit 213 refers to the wireless parameter adjustment table and selects the authentication scheme and encryption scheme that are capable of supporting the first and second setting schemes and that have the highest degree of security. Here, since the wireless apparatus 103 that supports the second setting scheme has been disassociated from the network, the schemes having the highest degree of security are selected from among wireless parameters supported in common by wireless apparatuses that are connected to the base station and that support the first setting scheme.

Next, at step S905, the wireless parameter adjusting unit 213 determines whether the wireless parameters selected at step S904 are different from the current wireless parameters 1002 that have been set in the base station 101. Control proceeds to step S906 if they are different. If they are not different, then this adjustment processing is exited.

The wireless parameter adjusting unit 213 starts up the wireless parameter notification processor 212 at step S906. By relying upon wired-LAN communication, the activated wireless parameter notification processor 212 notifies the management apparatus 104 of the wireless parameters selected at step S904.

Next, at step S907, the wireless parameter adjusting unit 213 updates the wireless parameters of the network of base station 101 to the wireless parameters selected at step S904. This processing is then exited.

In this example, the current wireless parameters 1002 in FIG. 10A are updated as indicated at 1003 in FIG. 10B. That is, attendant upon disassociation of the wireless apparatus 103 from the network, the base station 101 updates the authentication scheme to WPA, which has the highest degree of security among authentication schemes supported by the wireless apparatus that supports the first setting scheme, and updates the encryption scheme to AES, which has the highest degree of security among encryption schemes supported by the wireless apparatus that supports the first setting scheme.

As a result of the processing described above, the wireless apparatus 102 is cut off from the network of the base station 101 if the wireless parameters of this network are changed. Accordingly, in order for the wireless apparatus 102 to obtain wireless parameters that make connection possible, the wireless apparatus 102 communicates with the management apparatus 104 and acquires the current wireless parameters 1003 of the base station 101. The wireless apparatus 102 makes the connection to the base station 101 again using the wireless parameters 1003 acquired from the management apparatus 104. At this time the wireless apparatus 102 communicates with the management apparatus 104 and acquires the wireless parameters 1003 owing to control by the first setting processor 210 of base station 101 using a packet capable of being communicated with the base station 101 irrespective of the settings of the base station 101.

In accordance with the second embodiment described above, when a wireless apparatus having a different wireless parameter setting scheme is disassociated from a network, the base station changes the wireless parameters, thereby making re-connection possible without requiring that the user perform a troublesome operation for setting the wireless apparatus during connection.

Further, even in a case where a wireless apparatus has been disassociated, a base station having a plurality of wireless parameter setting schemes adjusts wireless parameter settings and notifies a management apparatus of the result of adjustment, whereby wireless parameters changed by a different setting scheme can be reflected in the parameter settings.

It should be noted that in the description rendered above, processing executed by the base station 101 when the wireless apparatus 103 is disassociated from the network of the base station 101 is described. However, it goes without saying that the base station 101 executes similar processing also in a case where the wireless apparatus 102 is disassociated from the network of the base station 101.

Third Embodiment

A third embodiment according to the present invention will now be described in detail with reference to the drawings. In the first and second embodiments, the management apparatus 104 has been described as an external apparatus connected to the base station 101 by a wired LAN. In the third embodiment, a case where a base station has a function equivalent to the management apparatus 104 will be described.

Figure 11:
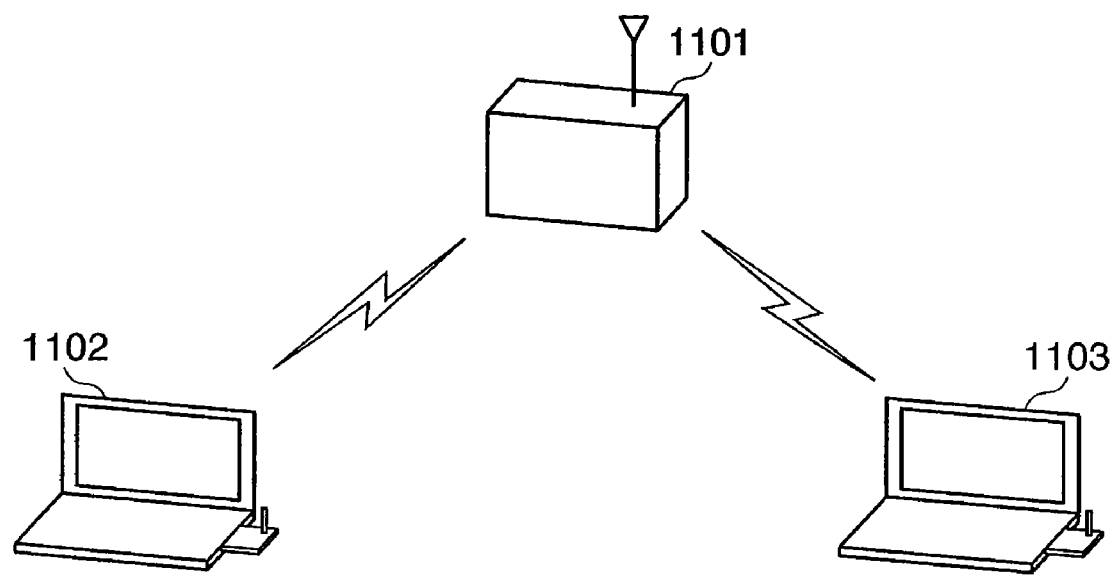
FIG. 11 is a diagram illustrating an example of the configuration of a wireless LAN system according to a third embodiment of the present invention.

FIG. 11 is a diagram illustrating an example of the configuration of a wireless LAN system according to the third embodiment. The LAN system of FIG. 11 comprises a base station 1101, a wireless apparatus 1102 and a wireless apparatus 1103.

Next, an example of the structure of the base station 1101 constituting the wireless LAN system of FIG. 11 will be described with reference to FIG. 12. The structure of the wireless apparatus 1102 and of wireless apparatus 1103 is similar to that of the first embodiment described above in conjunction with FIGS. 3 and 4.

Figure 12:
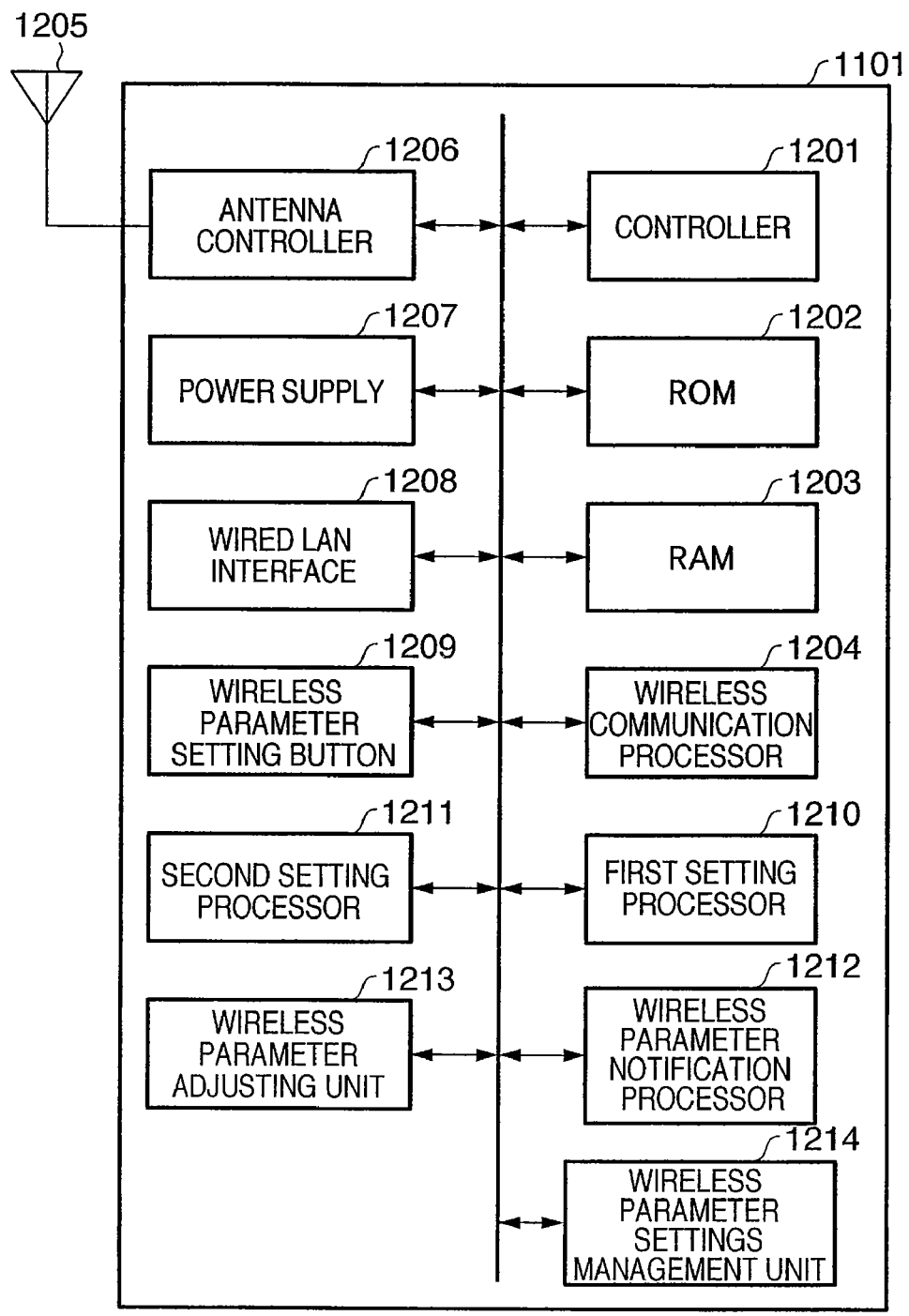
FIG. 12 is a block diagram illustrating an example of the structure of a wireless base station apparatus according to the third embodiment.

FIG. 12 is a block diagram illustrating an example of the structure of the base station 1101 according to the third embodiment. As illustrated in FIG. 12, the base station 1101 includes a controller 1201 for controlling the overall base station 1101. The controller 1201 exercises various types of control, described below, by executing control instructions, namely programs, that have been stored in a ROM 1202. Programs stored in the ROM 1202 cause the controller 1201 to execute various types of control, described later. A wireless parameter adjustment table, described later in detail, is stored in a RAM 1203. A wireless communication processor 1204 controls communication of a wireless LAN. The base station 1101 has an antenna 1205 and an antenna controller 1206.

The base station 1101 further includes a power supply 1207 and a wired LAN interface 1208 such as a USB or IEEE 1394. A wireless parameter setting button 1209 is for starting up processing to set wireless parameters. A first setting processor 1210 controls processing for setting wireless parameters by the first setting scheme, and a second setting processor 1211 controls processing for setting wireless parameters by the second setting scheme. A wireless parameter notification processor 1212 notifies a wireless settings management unit 1214 of the wireless parameters. A wireless parameter adjusting unit 1213 executes processing for adjusting wireless parameters based upon the wireless parameter adjustment table. The wireless settings management unit 1214 stores the wireless parameters that have been set in the base station 1101 and provides these wireless parameters to the wireless apparatus 1102 that supports the first setting scheme.

It is assumed that the content of the wireless parameter adjustment table in the third embodiment is similar to that shown in FIGS. 6A, 6D and that the first and second setting schemes in the third embodiment also are similar to those FIGS. 6A, 6B.

The third embodiment is such that when the wireless apparatus 1103 participates in or is disassociated from the network of the base station 1101, wireless parameters are selected in a manner similar to that of the first embodiment (S701 to S706) or second embodiment (S901 to 904). In a case where the wireless parameters of the base station 1101 are changed by the selected wireless parameters, the wireless parameter notification processor 1212 notifies the wireless settings management unit 1214 of the wireless parameters changed.

By virtue of this processing, the wireless parameters of the network of the base station 1101 are changed and therefore the wireless apparatus 1102 is disassociated from the network temporarily. Accordingly, in order to set the wireless parameters based upon the first setting scheme, the wireless apparatus 1102 communicates with the base station 1101 and acquires the current wireless parameters from the base station 1101. The wireless apparatus 1102 sets the wireless parameters acquired from the base station 1101 and is re-connected to the network.

In accordance with the third embodiment described above, effects similar to those of the first and second embodiments can be obtained even in a case where the base station is equipped with the wireless settings management unit.

Thus, even if communication parameters set by a first setting scheme have been changed by setting of communication parameters by a second setting scheme, the change can be reflected in the setting of communication parameters by the first setting scheme.

The present invention may be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, it goes without saying that the present invention covers a case where an operating system or the like running on the computer performs a part of or the entire process based upon the designation of program codes and implements the functions according to the embodiments.

Furthermore, program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the designation of program codes, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-208934, filed Jul. 31, 2006, which is hereby incorporated by reference herein in its entirety.

What is claimed is:

1. A communication apparatus comprising:
an acquisition unit that, while communication with a first communication apparatus is performed based on a first security type, acquires information on security types configured in a second communication apparatus that is different from the first communication apparatus, from the second communication apparatus;
a selecting unit that selects a second security type configured in common between the first communication apparatus and the second communication apparatus based on the information acquired by the acquisition unit; and
a communication unit that performs communication with the second communication apparatus based on the second security type selected by the selecting unit and performs communication with the first communication apparatus by changing the first security type to the second security type.

2. The apparatus according to claim 1, further comprising a setting unit that executes communication-parameter setting processing for other communication apparatuses according to the security types by a setting scheme, wherein the setting scheme is a scheme for notifying the other communication apparatuses of communication parameters, which are managed by a management apparatus, when the communication parameters are set in the other communication apparatuses.

3. The apparatus according to claim 2, further comprising a notification unit that notifies the management apparatus of the communication parameters selected by the selecting unit.

4. The apparatus according to claim 1, wherein the security types include at least an authentication type and an encryption type.

5. The apparatus according to claim 1, further comprising a termination unit that terminates communication parameter setting processing for the second communication apparatus if communication parameters configured in common, do not exist.

6. The apparatus according to claim 1, wherein the selecting unit selects a security type having a high degree of security among the security types configured in common between the first communication apparatus and the second communication apparatus.

7. The apparatus according to claim 1, wherein in a case where the second communication apparatus has been disassociated from a network, the selecting unit selects a third security type configure in common in the first communication apparatus in the network currently connected to said communication apparatus, and the communication unit performs communication with the first communication apparatus using the third security type.

8. The apparatus according to claim 1, further comprising a change prohibiting unit that prohibits a change of the first security type.

9. The apparatus according to claim 2, wherein said management apparatus is included within said communication apparatus.

10. The apparatus according to claim 7, wherein the third security type is the same security type as the first security type.

11. A method of setting communication parameters of a communication apparatus, said method comprising;
    an acquisition step of acquiring information on security types configured in a second communication apparatus that is different from a first communication apparatus, from the second communication apparatus, while communication with the first communication apparatus is performed based on a first security type;
    a selecting step of selecting a second security type settable in common between the first communication apparatus and the second communication apparatus based on information acquired in the acquisition step; and
    a communication step of performing communication with the second communication apparatus based on the second security type selected in the selecting step and performing communication with the first communication apparatus by changing the first security type to the second security type.

12. A non-transitory computer-readable storage medium on which has been recorded a program for causing a computer to execute the method of setting communication parameters of the communication apparatus set forth in claim 11.

* * * * *